April 13, 1948. J. C. CONRAD 2,439,718
COTTON CLEANING ATTACHMENT FOR HARVESTERS
Filed Dec. 30, 1943 3 Sheets-Sheet 1
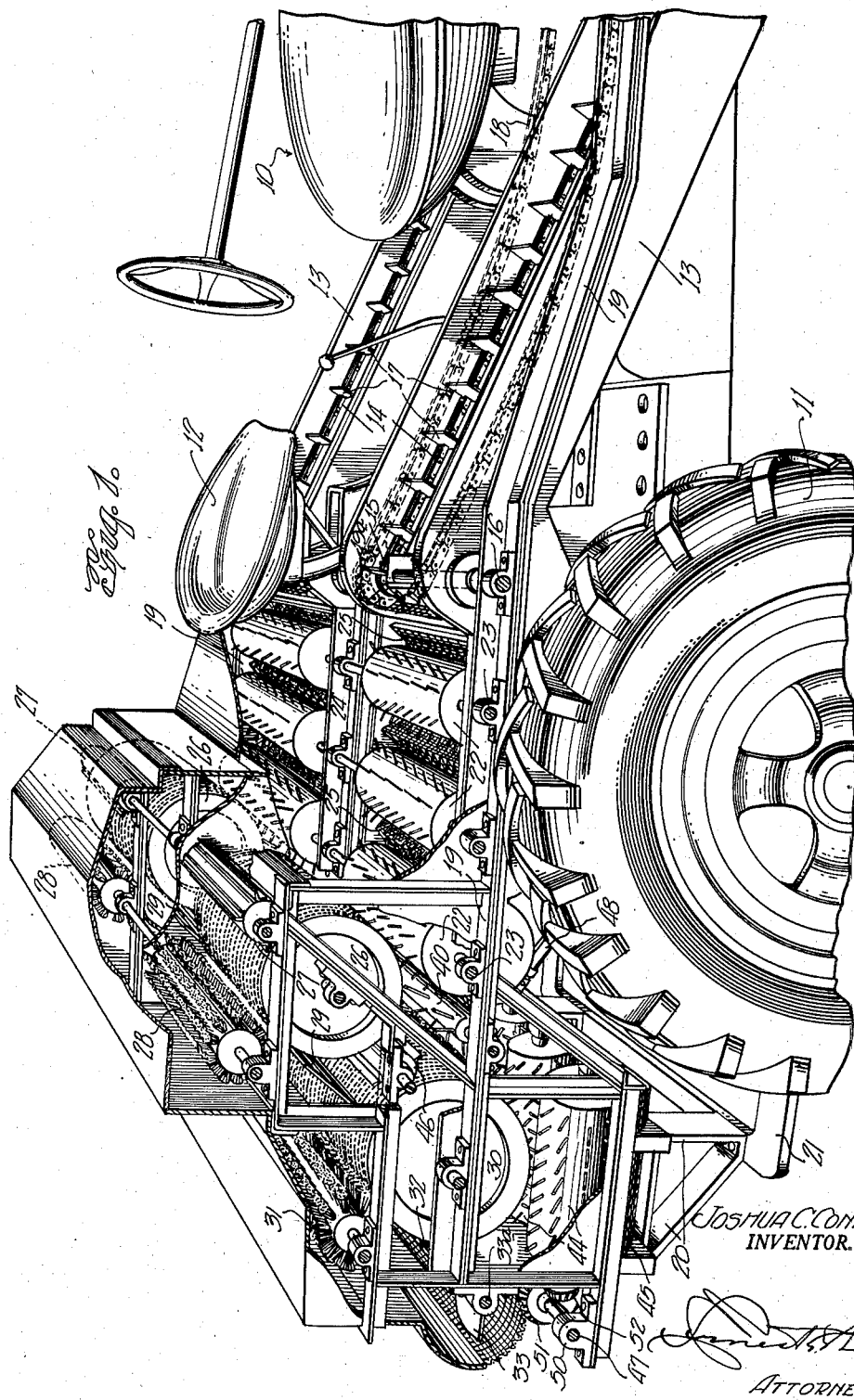
JOSHUA C. CONRAD
INVENTOR.
ATTORNEY

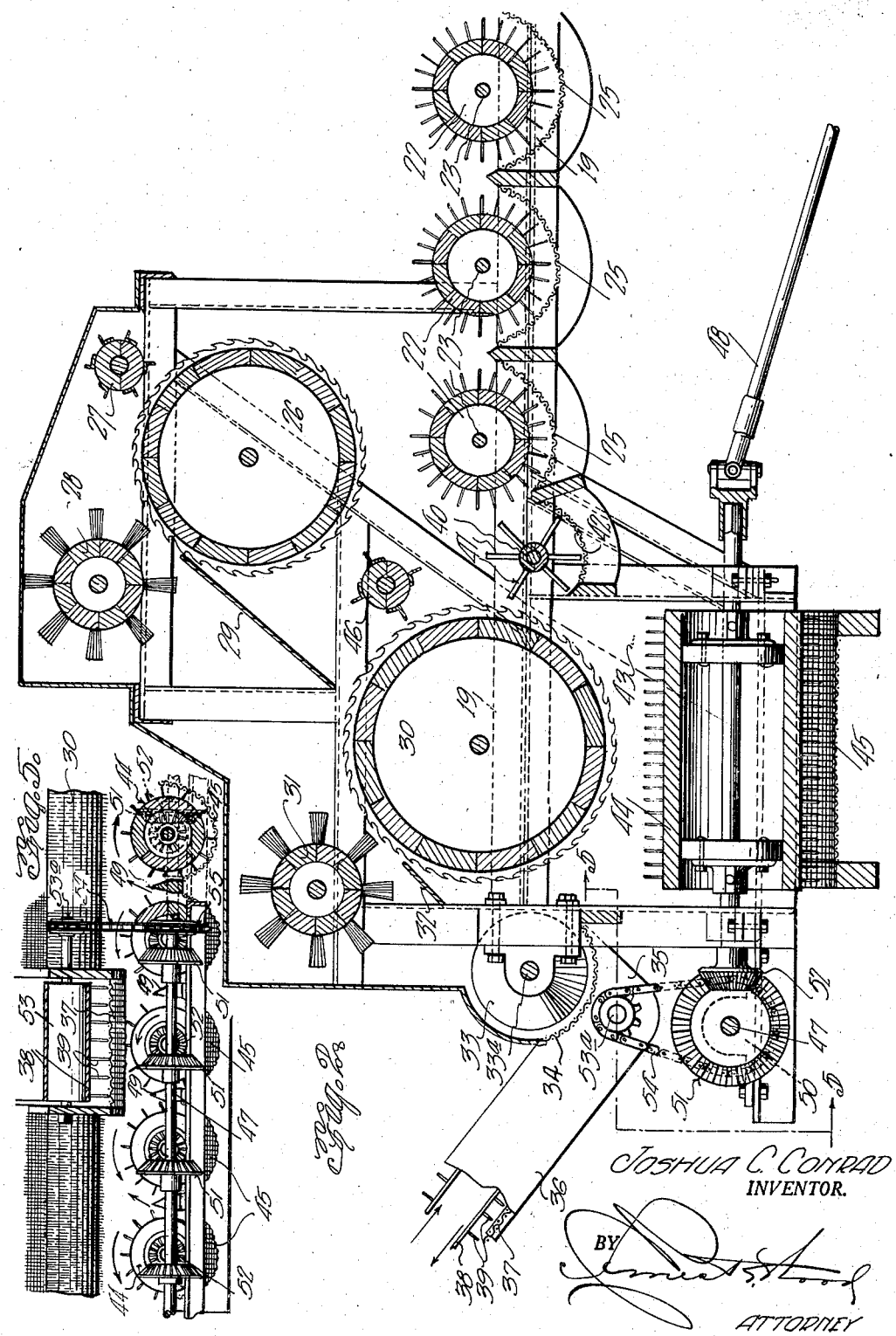

April 13, 1948.   J. C. CONRAD   2,439,718
COTTON CLEANING ATTACHMENT FOR HARVESTERS
Filed Dec. 30, 1943   3 Sheets-Sheet 3
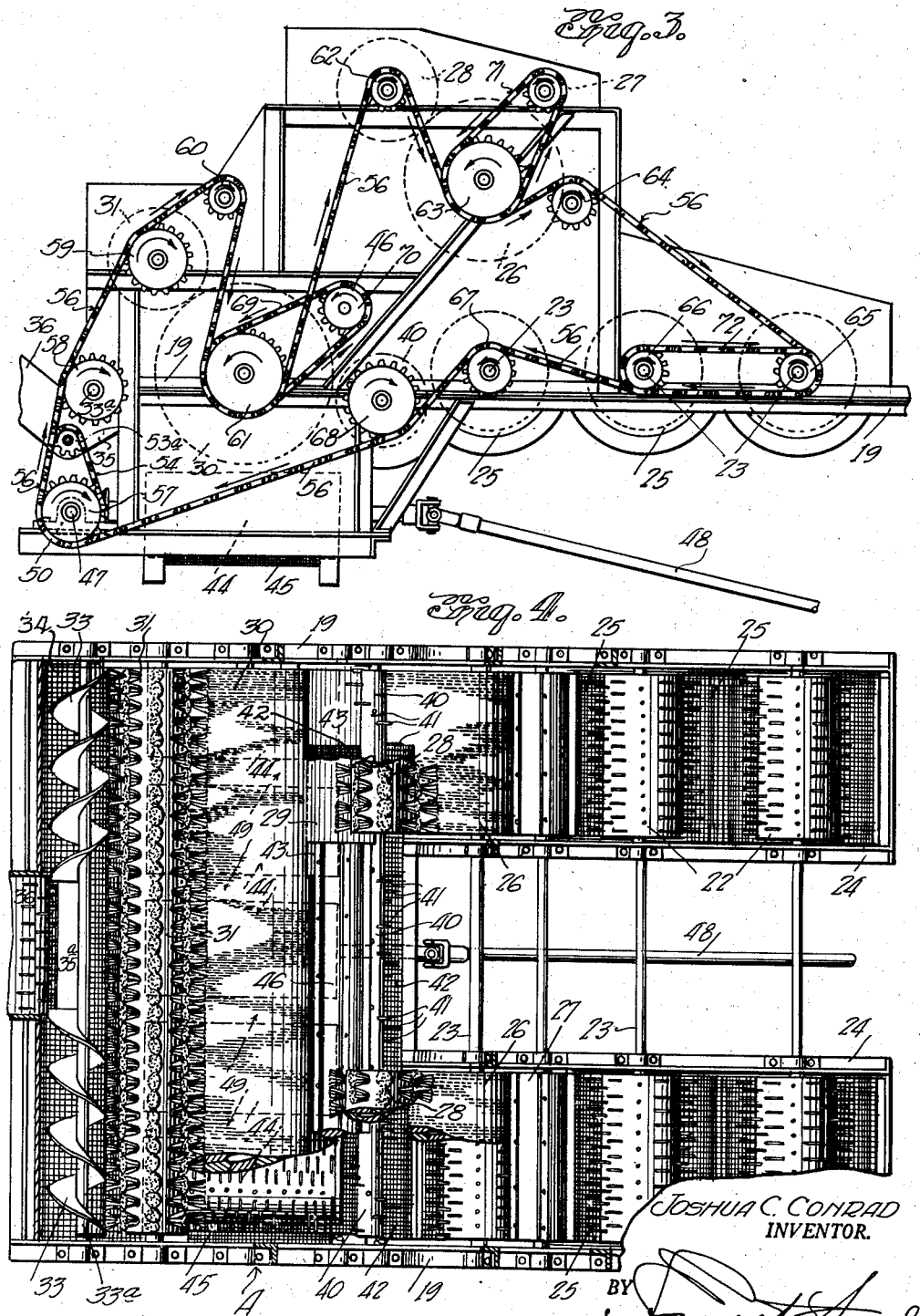
JOSHUA C. CONRAD
INVENTOR.
BY
ATTORNEY Patented Apr. 13, 1948

2,439,718

UNITED STATES PATENT OFFICE 2,439,718

COTTON CLEANING ATTACHMENT FOR HARVESTERS

Joshua C. Conrad, Oklahoma City, Okla.

Application December 30, 1943, Serial No. 516,201

6 Claims. (Cl. 19—37)

This invention relates to cotton cleaning machines and it has particular reference to a cleaning machine especially constructed to be attached to a tractor and operate in conjunction with harvesting equipment propelled thereby.

In separating cotton in the field from attendant trash such as leaves, sticks, limbs and burs, as it is stripped or otherwise removed from the stalk, a machine for the purpose must of necessity be compact and of such capacity that no congesting will occur therein to hinder normal travel of the tractor along the rows. It is therefore the chief object of the invention to provide such a machine in which provision is made for removing initially from the stream of material entering the machine the bulk or at least a substantial quantity of the cotton for processing and separate disposal from the residue material which is subjected to a more vigorous cleaning action from which cotton is removed and reassociated with that initially processed, in a suitable conveyor.

Another object of the invention is to provide a compact, durable and highly effective cleaning machine, readily attachable to and driven by a tractor and whose cleaning capacity is such that it will expediently remove trash from the cotton stripped from a plurality of rows simultaneously, the cotton of each row being delivered into the machine at different points and presented uniformly to the cleaning equipment to avoid congestion.

Another and highly important object of the invention is to provide primary and secondary cleaning equipment for processing respectively the comparatively clean cotton and the trash laden cotton, but to insure adequate processing of the latter cotton, a toothed impaling drum is afforded, having thereunder in transverse relationship, a plurality of spiked beater rolls, operating in foraminous concaves, with means in the form of inclined baffles intermediate each roll to direct the material propelled by the rolls upwardly against the underside of the drum for impalement out of the stream of trash progressing the length of the drum, thereby correcting the defects present in similarly designed cleaning mechanisms.

With the foregoing objects as paramount, the invention has particular reference to certain features of accomplishment, to become manifest as the description proceeds, taken in connection with the accompanying drawings, wherein:

Figure 1 is a perspective view of a cleaning machine constructed according to the present invention, shown mounted on a tractor and fragmentarily showing the attendant cotton stripping units;

Figure 2 is a view in vertical section.

Figure 3 is a side elevational view of the cleaning machine showing one form of driving means.

Figure 4 is a plan view of the cleaning assembly, and

Figure 5 is an end view of the transverse beater roll assembly of the secondary cleaning equipment, taken on line 5—5 on Figure 2, to illustrate the drive thereof, the attendant baffles and the relationship of the beaters with the impaling drum.

Broadly, the invention seeks to alleviate the harvesting problems confronting cotton producers by providing, not only for speedier gathering but likewise for rapid and efficient cleaning in the field to relieve the burden on over taxed cleaning equipment at the gin, at the same time producing a product of recognizably higher grade by the absence of impressed pin trash, commonly present in mechanically harvested cotton. Moreover, by divesting the cotton of attendant trash in the field, this trash becomes natural fertilizer on the soil and the producer enjoys a saving in harvesting expense inasmuch as the producer heretofore has had no alternative but to weigh out his trash with the cotton in determining harvesting wages.

Continuing with a more detailed description of the drawings, reference is primarily made to Figure 1 wherein 10 denotes a tractor, fragmentarily shown in this figure and having rear wheels 11. Actual harvesting of the cotton may be accomplished by any type of efficient stripping units, preferably situated on each side of the tractor within easy vision of the operator seated upon the seat 12.

The stripping units, fragmentarily illustrated in Figure 1 consist of inclined frames 13, forming troughs and in each of which is disposed endless chains 14, operating over sprockets 15, mounted on transverse shafts 16 in each end of the frame. These chains support a plurality of relatively spaced plates or paddles 17 which, in moving upwardly through the trough, convey the cotton extracted from the stalks, together with attendant trash, into the cleaning equipment of the invention for processing, to be presently described. As a means for operating the stripping units, a chain 18 is shown as surrounding a sprocket 19a, mounted on the upper transverse shaft 16, and a sprocket, not shown, mounted on the side power take-off of the tractor, which has also been deleted.

Referring now to the invention, it will be noted that the frame is made up chiefly of angle iron, with the side members 19 elongated to extend alongside the tractor towards the forward end, to be bolted to the tractor frame at a point not shown in the drawings. Below the rear portion of the machine frame, a support 20 is provided which rests upon the draft bar 21 of the tractor. Obviously variations and auxiliaries may be made in the mounting as may be expedient or necessary to adapt the frame to tractors or other implements of different design.

It will be observed that the machine illustrated has been designed to accommodate two rows of cotton, in that two sets of primary cleaning elements have been provided, one on each side of the machine in alignment with the stripping frames 13. Each of the primary cleaning units consists of a plurality of relatively parallel beater cylinders 22 mounted on shafts 23, the outer ends of which are journaled in bearings mounted on the elongated beams 13 of the machine frame while the inner ends are journaled in similar bearings supported on parallel rails 24 spaced inwardly from the beams 13, defining an intervening space to accommodate the seat 12 of the tractor. These cylinders have rows of spikes over their surfaces and, except for the innermost cylinder, they rotate in a clockwise direction over foraminous concaves 25 in the usual manner. The inner cylinder revolves in a counterclockwise direction to insure the passage of incoming material upwardly and over, into the effective range of the respective impaling drums 26, and a larger drum 30, the purpose and advantage of which will presently become manifest.

In the course of the foregoing description, it became apparent that it is the primary intent of the invention to separate the cotton from the burs and trash rather than follow the usual custom of separating the burs and trash from the cotton. To accomplish this in a minimum amount of space, the bulk of the cotton entering the machine through the action of the strippers and the beater cylinders 22 being fluffy and comparatively free of clinging trash, sticks, leaves and the like, is readily intercepted and extracted from the stream at the outset and transported to a point of disposal after a preliminary cleaning operation. Since the amount of trash content in the bulk of cotton is at the minimum, the cotton easily adheres to the teeth of the drum 26 as it is propelled upwardly by the inner cylinder 22 and as it is carried upward, it is subjected to the action of the stripper roller 27, thence is doffed from the drum by the doffing brush 28 onto the chute 29 which deposits the cotton onto secondary impaling drum 30 and is instantly doffed by the doffing brush 31 onto a second chute 32, which delivers the cotton into the rear conveyor 33 operating on a shaft 33a. At this point, it is mentioned that this conveyor, into which all of the cotton treated by both the primary and secondary cleaning units eventually finds its way, is provided with right and left hand spiral flights and operates in a foraminous trough 34 which has a receptacle 35 midway between its ends into which the cotton is advanced from each end by the conveyor. A knocker plate 35a is provided between the inner ends of the flights of the conveyor 33 to insure the propulsion of cotton into the receptacle 35. An elevator housing 36 communicates with the receptacle and this also has a screen bottom 37 (Figure 2) over which is passed an endless belt 38 having spikes 39 therein for elevating the cotton from the receptacle 35, over the screen bottom, into a sutable trailer or other receptacle, not shown.

Returning now to the cleaning mechanism, it is pointed out that the treatment given the cotton just described is referred to herein as the primary cleaning treatment and deals only with that cotton which adheres to the drums 26, these being a part of the primary cleaning assemblies. The secondary cleaning assembly consists of the larger and longer drum 30, the latter extending the full width of the machine and the doffing brush 31 which serves to doff the primary cotton, as described, as well as the secondary cotton which failed to adhere to the drums 26.

The trash laden cotton escaping the primary cleaning action is delivered by the inner beater cylinder 22 into the effective range of a beater conveyor, consisting of a roller 40, extending the full width of the machine in close proximity to the drum 30. This roller has thereon a spiral row of radially extending spikes 41 and operates over a foraminous concave 42 as a continuation of the concaves 25 of the beater cylinders 22. It is apparent that cotton deposited into this beater conveyor will be caused to traverse the up-going face of drum 30 so long as it is supported by the screen 42. However, for reasons to become apparent presently, the concave screen 42 terminates short of the end of the beater conveyor 40, as shown in Figure 4.

That material which enters the left hand beater assembly, viewing the machine from the front, is deposited by the inner beater 22 into the beater conveyor 40, which carries it along the face of drum 30 until the residue reaches the space at the end of the concave 42 of the beater conveyor 40, occupied by an inclined chute 43, see Figures 2 and 4. As the residue material falls into this chute, it is immediately deposited thereby into the first two of the assembly of transverse beater rolls 44 which operate over foraminous concaves 45 under the large impaling drum 30.

The material which enters the machine by way of the right hand assembly of beater cylinders 22, after having undergone the primary cleaning action earlier described, is discharged into the chute 43, after which, it also is received by the first two beater rolls 44, for subjection to the impaling action of drum 30, as the material is propelled to the left by the beater cylinders 44 throughout the length of the assembly preparatory to the discharge of the residue trash from the machine at the left end of the assembly of beater rolls 44 at A in Figure 4.

In the meantime, the material borne to the right by the beater conveyor 40, along the face of the drum 30, is being subjected to the impaling action of drum 30 before discharge into the chute 43. Such material as is caught up by the teeth of the drum is first stripped of clinging trash by the stripper roll 46, extending the length of the drum 30, to be returned to the beater conveyor 40 for reprocessing after which, the cotton is removed and discharged into the chute 32 by the doffing brush 31.

A certain amount of the material received by the beater conveyor 40 will be at once discharged into the beater rolls 44 at the left end of the assembly and throughout the length thereof as the remaining material is carried along in the effective range of the saw teeth. On the other hand, the material entering by the way of the right hand assembly of beater cylinders enters directly into the transverse beater assembly 44 through the chute 43.

In Figure 5, a view of the transverse beater assembly is afforded, looking from the rear of the machine hence the beater at the extreme right in this figure is the last and discharge beater of the assembly and is shown in transverse section, with the bevel gear 51 in dotted lines to disclose the construction of the beater 44 and to better illustrate the relationship of the baffles 49 and the beaters. It will be observed that all except this beater revolve in the counterclockwise direction. The shaft of the centermost beater 44 serves to impart rotation to drive shaft 47 by which all of the beaters are driven by reason of its connection at its opposite end to the rear power take-off of the tractor through the universal shaft 48. However, clockwise rotation of the last of the series of the beaters 44 is significant in that such rotation retards too rapid discharge of the material from the machine, affording sufficient time to insure adequate exposure thereof to the impaling action of the drum 30, which not only impales the cotton exposed thereto throughout the length of the beater conveyor 40, but also throughout the length of the beater assembly 44. All of the cotton thus impaled is discharged by brush 31 into the right and left hand conveyor 33 for disposition by the elevator belt 38, as described.

In simply arranging a series of beater cylinders below a large impaling drum with their axes at right angles to the axes of the drum is not herein regarded in itself as a departure from earlier attempts to obtain a cleaning effect through a similar arrangement. No cleaning action will result through such an arrangement unless provision is made to insure that the cotton will be propelled against the drum. Accordingly, the invention provides, as shown in Figure 5, a series of baffles 49, rising between each of the beater rolls 44 and having walls inclined in the direction of thrust of the roll so as to direct the material upwardly toward the undersurface of the drum 30. Without these baffles, the material will not be thrown upwardly and instead, will travel the length of the assembly underneath the rolls to the discharge and without being subjected to the impaling action of the drum. The shaft 47, rearwardly of and at right angles to the axes of the rolls 44 is journaled in bearings 50, supported on the frame of the machine. Viewing this shaft in Figure 5, it is shown as being provided throughout its length with beveled gears 51, enmeshing gears 52 mounted on the rear ends of the shafts carrying the beater rolls 44, their relationship determining the direction in which the roll is to be rotated.

The belt 38 of the elevator is driven by its being mounted on a roller 53 (Figure 5), whose shaft 53a in turn is driven by a chain 54, surrounding a sprocket on the shaft 53a and a sprocket 55 on the shaft 47.

While no restrictions are intended as to the manner of driving the several elements of the described assembly, a form of drive is exemplified in Figure 3. This drive consists of a link chain 56 which, beginning with the sprocket 57 on the shaft 47, which is the main drive shaft, this chain extends past and is engaged by the teeth of a sprocket 58, mounted on the shaft 33a of the conveyor 33, rotating the shaft 33a in a clockwise direction. However, the flights of this conveyor, being right and left hand, the material will be conveyed towards the middle.

Continuing upward, the chain 56 engages the teeth of a sprocket 59, mounted on the shaft of the doffing brush, rotating the latter in a clockwise direction. The chain thence extends over an idler sprocket 60, thence under sprocket 61 on the shaft of the drum 30 to rotate the latter in a counterclockwise direction. Extending over sprocket 62, doffing brushes 28 are operated in a clockwise direction while drums 26 are rotated counterclockwise by the chain extending under sprocket 63. Chain 56 then extends over an idler sprocket 64, thence downward to a sprocket 65 on the shaft 23 of the first pair of beater cylinders 22 of the assembly and thence extends rearwardly under sprocket 66 of the second and over sprocket 67 of the shaft 23 of the third and last pair of beaters 22, causing them to rotate in opposite directions relative to the companion beaters 22, after which the chain extends under sprocket 68 of the beater conveyor 40 and finally to the main drive sprocket 57.

A separate drive is provided for the stripper roll 46 attending the secondary impaling drum 30 through the medium of a chain 69, extending over sprocket 70 to the shaft of the stripper roll and a separate sprocket mounted adjacent sprocket 61 on the drum shaft. A chain 71 provides a separate drive for the stripper rolls 27 attending the primary drums 26 and to insure an adequate drive for the first two pairs of beater cylinders 22, a separate drive is afforded through a chain 72, surrounding sprockets adjacent sprockets 65 and 66. The drive described in the foregoing is illustrated only in Figure 3, it being deleted from the other figures for the sake of clarity.

Inasmuch as the operation of the invention has been described in the course of the description concerning the construction and assembly of parts, it is believed that the operation of the invention has been made sufficiently clear without added explanation.

Manifestly, the construction as shown and described is capable of some modification and such modification as may be construed to fall within the scope and meaning of the appended claims is also considered to be within the spirit and intent of the invention.

What I claim and desire to secure by Letters Patent is:

1. A machine for separating cotton from burs and other foreign matter in the field including parallel assemblies of receiving rolls, a primary separating assembly attending each of said receiving roll assemblies comprising an impaling drum, stripping roll and doffing brush, a secondary separating assembly comprising an impaling drum, stripping roll and doffing brush, means for receiving material escaping the action of said primary separating assembly for subjecting the same to the action of said secondary assembly, a series of beater cylinders disposed under said secondary impaling drum adapted to receive material escaping the initial impaling action of said drum, baffles intermediate the beater cylinders for directing material against said secondary drum, means for directing cotton processed by said primary separating assembly onto the top of the impaling drum of said secondary assembly and right and left hand conveyors means for receiving cotton processed by both of said separating assemblies and that treated only by said secondary assembly, for final disposition.

2. A machine for separating cotton from trash in the field comprising parallel assemblies of receiving rolls, primary separating assemblies disposed above the last of said receiving rolls including impaling drums for removing from the stream of material entering said machine the bulk of cotton, a secondary assembly also including an impaling drum for receiving the residue material for processing, means for directing cotton from the drum of said primary assemblies onto the upper surface of the drum of said secondary assembly, means for advancing along the upgoing side of said drum the material escaping the action of said primary separating assemblies, a final separating assembly comprising a plurality of beater cylinders disposed under and in transverse relation to the impaling drum of said secondary assembly for moving material in a direction counter to its advancement by said latter means, baffles intermediate said cylinders having walls inclined to the thrust of an adjacent cylinder for directing material against said drum and a common conveyor means for receiving the cotton initially from said primary assemblies and finally from said secondary assembly for disposition.

3. In a machine for separating cotton from trash, a pair of primary impaling drums, parallel assemblies of beater cylinders for initially receiving and conveying trash laden cotton into the operative influence of said impaling drums, a conveyor into which the bulk of the separated cotton is transported from said impaling drum, a secondary impaling drum disposed below the primary impaling drum, means for advancing the material escaping the action of said primary impaling drum, along the face of said secondary impaling drum for processing the same, a final separating assembly for receiving material escaping the action of said primary and secondary impaling drums comprising a series of beater cylinders transversely disposed under the secondary drum, effective to move said material in a direction counter to its advancement by said latter means, baffles rising above the common axis level of said beater cylinders for constraining materials to remove into the influence of said secondary drum for impalement thereby and means for transferring the cotton separated by said secondary drum into said conveyor for final disposition.

4. A machine for separating field cotton from its trash contents, comprising two groups of cooperative beater cylinders initially receiving and transporting material into said machine, an impaling drum operated above the rearmost of the beater cylinders of each group against which cotton is propelled thereby for removing from the transported material the bulk of cotton for cleaning, a second impaling drum, means for depositing cotton from said first drum onto the top of said second drum for reprocessing, means for receiving material escaping impalement by said first drum and adapted to propel the same along the upgoing side of said second drum to remove cotton from its trash contents, a final cleaning assembly comprising a plurality of parallel beater cylinders operating in foraminous concaves under said second drum, transverse to its axis, and adapted to propel the material in a direction counter to its movement by said latter means, baffles extending upwardly between each of said parallel cylinders and a common means for receiving the separated cotton from the cleaning and separating means.

5. In a cotton cleaning attachment for tractors, a plurality of primary cleaning assemblies, each including a toothed drum into which material is continuously conveyed from the stalk for separation of cotton from its trash contents, parallel assemblies of receiving rolls for conveying said material, the rearmost of which rolls propel the material upwardly against respective drums of said cleaning assemblies, a conveyor receiving the separated cotton from said cleaning assemblies, a secondary cleaning assembly including a second toothed drum, means for receiving and advancing the residue material along the upgoing side of said second drum for separating therefrom the remaining cotton, a final cleaning assembly comprising a plurality of beater cylinders transversely disposed below said secondary cleaning assembly for propelling material in a direction counter to its movement by said first means and having means for constraining material to move upwardly into contact with the underside of said second drum, means for transferring the separated cotton from the said latter assembly into said conveyor for disposition and means for ejecting the trash from said machine.

6. A cotton cleaning attachment for tractors including primary cleaning assemblies, each having an impaling drum, a group of cooperating beater cylinders operating below the plane of said cleaning assemblies, serving each of said assemblies to transport trash laden cotton thereinto and to propel the same against the impaling drums thereof, a secondary cleaning assembly having an impaling drum onto the top of which cotton from said first drums is discharged, means for receiving and advancing the material escaping impalement by said first drum along the upgoing side of the drum of said secondary assembly for processing thereby, a final cleaning assembly comprising a plurality of beater cylinders transversely disposed under the drum of said secondary assembly for moving material in a direction counter to its movement by said latter means and having intermediate means for compelling material against the undersurface of said latter drum, a common means for receiving the discharge of said cleaning assemblies and means for discharging extracted trash from said machine.

JOSHUA C. CONRAD.

REFERENCES CITED

The following references are of record in the file of this patent:

UNITED STATES PATENTS

| Number | Name | Date |
|---|---|---|
| 1,870,039 | Conrad | Aug. 2, 1932 |
| 1,990,816 | Conrad | Feb. 12, 1935 |
| 2,049,640 | Conrad | Aug. 4, 1936 |
| 2,079,547 | Court | May 4, 1937 |
| 2,100,303 | Mitchell | Nov. 23, 1937 |
| 2,123,405 | Court | July 12, 1938 |